United States Patent
Kumagai et al.

Patent Number: 5,432,249
Date of Patent: Jul. 11, 1995

[54] LIQUID CRYSTALLINE POLYESTERS

[75] Inventors: Yoshihiro Kumagai; Takuya Matsumoto; Iwane Shiozaki; Shigeki Takikawa, all of Yokohama, Japan

[73] Assignee: Nippon Oil Company, Limited, Tokyo, Japan

[21] Appl. No.: 361,122

[22] Filed: Dec. 21, 1994

[30] Foreign Application Priority Data

Dec. 22, 1993 [JP] Japan .................. 5-354704
Dec. 27, 1993 [JP] Japan .................. 5-354854

[51] Int. Cl.⁶ ............................................. C08G 63/54
[52] U.S. Cl. ..................................... 528/192; 528/176;
  528/193; 528/219; 528/272; 528/302; 528/303;
  528/306; 528/308; 528/308.6
[58] Field of Search .............. 528/176, 192, 193, 219,
  528/272, 302, 303, 306, 308, 308.6

[56] References Cited

U.S. PATENT DOCUMENTS

| | | | |
|---|---|---|---|
| 4,284,710 | 8/1981 | Burg | 430/271 |
| 4,343,888 | 8/1982 | Burg | 430/302 |
| 4,421,841 | 12/1983 | Shimizu et al. | 430/285 |
| 4,517,349 | 5/1985 | Fujiwara et al. | 526/313 |

OTHER PUBLICATIONS

W. R. Krigbaum et al. (1983) Thermotropic Homopolyesters. III. Preparation and Properties of Polymers Based on 4'-Hydroxyphenyl-4-Hydroxycinnamate, *J. Pol. Sci.: Pol. Phys. Ed.* 21:1851–1872.

F. Navarro et al. (1989) Synthesis and Properties of Two New Series of Isomeric Liquid Crystalline Polyesters with Conjugated Double Bonds, *J. Pol. Sci.: Part A: Pol. Chem.* 27:3691–3701.

F. Navarro et al. (1992) Thermotropic Aromatic Copolyesters of Catechol, *J. Pol. Sci.: Part A: Pol. Chem.* 30:1789–1798.

*Primary Examiner*—Samuel A. Acquah
*Attorney, Agent, or Firm*—Scully, Scott, Murphy & Presser

[57] ABSTRACT

The present invention provides a novel liquid crystalline polyester comprising structural units represented by the following general formulae A, B, C and D:

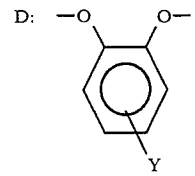

where X and Y are each independently H, Cl, Br or an alkyl group having 1 to 4 carbon atoms, the molar ratio of A/B is in the range from 49/1 to 20/30 and that of C/D is in the range from 10/40 to 45/5.

4 Claims, 6 Drawing Sheets

LIQUID CRYSTALLINE POLYESTERS

BACKGROUND OF THE INVENTION

The present invention relates to a liquid crystalline polyester easy to fix its liquid crystal orientation in glass phase, exhibiting a large wavelength dispersion of birefringence and suitable for the application to an optical element.

Recently, as to liquid crystalline polymers, research and development have been made actively in the field of high-performance materials utilizing high heat resistance and moldability or in the field of functional materials utilizing changes in liquid crystal structure caused by heat or by an eternal field such as an electric field and also utilizing the fixing of phase. Particularly, in the field of high-performance materials, commercialization has already been achieved. On the other hand, in the field of functional materials, although research has actively been directed towards attaining the application of such polymers in optical recording, non-linear optical materials, alignment films for crystals, optical fibers and optical elements for liquid crystal displays, commercialization has not been achieved yet. In the case of application of liquid crystalline polymers to functional materials, the application can be broadly classified into one which utilizes a dynamic change in phase transition of liquid crystal and one in which a molecular orientation peculiar to liquid crystal is fixed for utilization as a static element. In both such applications, most uses employ optical properties of liquid crystal. In connection with the latter application just mentioned above, as important conditions required for liquid crystalline polymers capable of being fixed their liquid crystal orientations and applicable to optical elements, there are mentioned conditions such that the fixing of liquid crystal orientation should be easy, the liquid crystal orientation after fixing should be stable, and optical properties such as refractive index, birefringence and wavelength dispersion should be freely controllable. Particularly, if an optical element exhibiting a large wavelength dispersion of birefringence, for which there has been a great demand recently in the display field, can be produced using a liquid crystalline polymer, it becomes possible to obtain an epoch-making optical element in combination with properties for polarized light peculiar to a fixed structure of liquid crystal orientation.

However, a liquid crystalline polymer exhibiting a large wavelength dispersion of birefringence and capable of being fixed its liquid crystal orientation stably and hence capable of being used as the material of such optical element as just mentioned above, has not been developed yet, nor has there been made scarcely any research.

It is the object of the present invention to solve the above-mentioned problem of the prior art.

SUMMARY OF THE INVENTION

Having paid attention to a liquid crystalline polyester assuming glass phase at a temperature lower than the liquid crystal transition point thereof as a liquid crystalline polymer easy to fix its orientation and less expensive and easy to manufacture industrially, and having searched for a unique structure capable of attaining the required large wavelength dispersion of birefringence, the present inventors found out that such conditions were satisfied by a polyester containing catechol unit and 4-hydroxycinnamic acid unit or phenylene diacrylate unit as structural units in the molecule. In this way we accomplished the present invention.

The present invention resides in a liquid crystalline polyester comprising structural units represented by the following general formulae:

where X and Y are each individually H, Cl, Br, or an alkyl group having 1 to 4 carbon atoms, A/B mole ratio is in the range from 49/1 to 20/30, and C/D mole ratio is in the range from 10/40 to 45/5.

DETAILED DESCRIPTION OF THE INVENTION

The polymer of the present invention comprises terephthalic acid unit (A), 4-hydroxycinnamic acid unit (B1) or phenylene diacrylate unit (B2), hydroquinone or substituted hydroquinone unit (C) and catechol or substituted catechol unit (D). Many liquid crystalline polyesters having an aromatic ring are known, but a polymer containing both 4-hydroxycinnamic acid unit or phenylene diacrylate unit and catechol unit is not known at all. Generally, a rigid molecule of high linearity is preferred for exhibiting good liquid crystallinity, but since catechol unit acts to disturb the linearily of molecule, it is seldom introduced. Reference can be made to only limited examples of introducing catechol Unit for lowering the melting point of polymer or for improving the solubility thereof (see, for example, F. Navarro et al., J. Polym. Sci., Polym. Chem. Ed., 1992, 30, 1789). Also as to 4-hydroxycinnamic acid unit and phenylene diacrylate unit, these units are seldom employed usually from the standpoint of stability although there are examples of introducing them into polymer for imparting photoreactivity to the polymer (see, for example, W. R. Krigbaum et al., J. Polym. Sci., Polym. Phy. Ed., 1983, 21, 1851, and F. Navarro et al., J. Polym. Sci., Part A, 1989, 27, 3691).

Regarding both such units whose introduction into polymer is usually avoided, the present inventors have positively introduced them into the same molecule for the purpose of preparing a liquid crystalline polymer capable of fixing its liquid crystal orientation and exhibiting a large wavelength dispersion of birefringence. As a result, it turned out that the polymer with both units thus introduced therein assumed glass phase at a temperature lower than the liquid crystal transition point (i.e., glass transition point Tg) thereof, without impairing its liquid crystallinity, could be fixed its liquid crystal structure and had a large wavelength dispersion of birefringence.

Unit A is usually derived from a polyester-forming functional derivative such as terephthalic acid or dimethyl terephthalate, while unit B is usually derived from a polyester-forming functional derivative such as 4-hydroxycinnamic acid, 4-acetoxycinnamic acid, phenylene diacrylic acid or phenylen diacrylic acid dichloride.

Unit C is a unit usually based on a polyester-forming functional derivative such as hydroquinone or a substituted hydroquinone, or a diacetate thereof. X is H, Cl, Br, or an alkyl group having 1 to 4 carbon atoms. As examples of such alkyl group there are mentioned methyl, ethyl, i-propyl, butyl and t-butyl, with methyl, ethyl and t-butyl being particularly preferred. Unit D is a unit usually based on a polyester-forming functional derivative such as catechol or a substituted catechol, or a diacetate thereof. Y is H, Cl, Br, or an alkyl group having 1 to 4 carbon atoms. As examples of such alkyl group are mentioned methyl, ethyl, i-propyl, butyl and t-butyl, with methyl, ethyl and t-butyl being particularly preferred. Of course, it is optional whether each constituent unit should be arranged in block or random form.

These constituent units are present in the following mole ratios in the polymer. A/(C+D) is in the range from 45/55 to 55/45, preferably 48/52 to 52/48, more preferably 50/50, and A/B is preferably in the range from 49/1 to 20/30, more preferably 48/2 to 25/25. If A/B is smaller than 20/30, that is, if the proportion of 4-hydroxycinnamic acid or phenylene diacrylate unit is too large, there will occur undersirable influences; for example, the development of liquid crystallinity may be impeded, or the polymer may become less stable. Conversely, if the said ratio is larger than 49/1, that is, if the proportion of terephthalic acid is too large, the wavelength dispersion of birefringence may become smaller and in this case it is impossible to attain the desired effect.

As will be seen from the fact that the polymer is polyester, the carboxylic acid residue and alcohol residue (—O—) in the constituent units should be kept substantially in an equimolar relation. Therefore, A/(C+D) in the case of polyester comprising A, B1, C and D, or (A+B)/(C+D) in the case of polyester comprising A, B2, C and D, is usually in the range from 45/55 to 55/45, preferably 48/52 to 52/48, more preferably 50/50.

As to the value of C/D, it is preferably in the range from 10/40 to 45/5, more preferably 15/35 to 40/10. If this value is smaller than 10/40, that is, if the proportion of catechol unit is too large, the development of liquid crystallinity may be impeded, while if it is larger than 45/5, that is, if the proportion of hydroquinone unit is too high, the polymer will come to have a crystal phase, which may result in that the fixing of liquid crystal orientation cannot be effected.

The molecular weight of the polymer is preferably in the range of 0.05 to 3.0, more preferably 0.07 to 2.0, in terms of an inherent viscosity, $\eta$inh, as determined in mixed phenol/tetrachloroethane solvent (60/40 weight ratio) at 30° C. If the $\eta$inh value is smaller than 0.05, the strength of a certain element produced by using the polymer may be deteriorated and thus such value is not desirable. A larger value than 3.0 is not desirable, either, because the melt viscosity will become too high, which may lead to deteriorated orientability of liquid crystal.

The glass transition point Tg of the polymer is preferably higher than 50° C., more preferably higher than 70° C., while the upper limit thereof is not particularly specified, but is preferably lower than 300° C. If Tg is lower than 50° C., then even if the fixing of liquid crystal orientation can be effected, the reliability at high temperatures will be lost and in this case it may be impossible to make stable use as an industrial material.

How to prepare the polymer of the present invention is not specially limited. There may be adopted a polymerization method known in the field concerned, for example a melt polymerization method or a solution polymerization method using an carboxylic acid chloride of a corresponding carboxylic acid.

In the case where a melt polycondensation process is adopted, the polymer can be prepared, for example, by the reaction of terephthalic acid (component $A^1$), 4-acetoxycinnamic acid (component $B1^1$), a hydroquinone diacetate (component $C^1$) represented by the following general formula (1) where X is as defined previously and a catechol diacetate (component $D^1$) represented by the following general formula (2) where Y is as defined previously, at a high temperature and under a reduced pressure or high vacuum:

(1)

(2)

As examples of the above hydroquinone diacetate are mentioned hydroquinone diacetate, methylhydroquinone diacetate, ethylhydroquinone diacetate, t-butylhydroquinone diacetate, chlorohydroquinone diacetate and bromohydroquinone diacetate. As examples of the above catechol diacetate are mentioned catechol diacetate, methylcatechol diacetate, ethylcatechol diacetate, propylcatechol diacetate, t-butylcatechol diacetate, bromocatechol diacetate and chlorocatechol diacetate.

The molecular weight of the polymer can be controlled easily by controlling the polymerization time or the feed composition. Conditions for the polymerization are not specially limited, but usually involve a temperature of 150° C. to 350° C., preferably 200° C. to 300° C., and a reaction time of 30 minutes or longer, preferably 1 to 20 hours. The reaction may be carried out at atmospheric pressure or reduced pressure.

As to feed compositions (mole ratios) of the starting components to $A^1$ to $D^1$, the value of $A^1/(C^1+D^1)$ is usually in the range from 40/60 to 60/40, preferably 45/55 to 55/45, more preferably 48/52 to 52/48, most preferably 50/50. The value of $A^1/B^1$ is preferably in the range of 49/1 to 20/30, more preferably 48/2 to 25/25, and the value of $C^1/D^1$ is preferably in the range of 10/40 to 45/5, more preferably 15/35 to 40/10.

As to feed compositions (mole ratios) of the starting components $A^1$ to $D^1$ in the case of using phenylenediacrylic acid (component $B2^1$) in place of the above 4-acetoxycinnamic acid (component $B1^1$), the value of $(A^1+B^1)/(C^1+D^1)$ is usually in the range from 40/60 to 60/40, preferably 45/55 to 55/45, more preferably 48/52 to 52/48, most preferably 50/50.

The value of $A^1/B^1$ is preferably in the range from 49/1 to 25/25, more preferably 48/2 to 30/20, and the value of $C^1/D^1$ is preferably in the range from 10/40 to 45/5, more preferably 15/35 to 40/10.

A known metal salt such as, for example, sodium acetate or zinc acetate, or an organic amine, may be used to accelerate the polymerization reaction.

In the case of using the solution polymerization process, the desired liquid crystalline polyester can be prepared easily by dissolving in a solvent a terephthalic acid dihalide (component $A^2$) such as terephthalic acid dichloride or terephthalic acid dibromide, a 4-hydroxycinnamic acid halide (component $B1^1$) such as 4-hydroxycinnamic acid chloride or 4-hydroxycinnamic acid bromide, a hydroquinone (component $C^2$) of the following general formula (3) and a catechol (component $D^2$) of the following general formula (4), followed by heating in the presence of an acid acceptor such as pyridine:

(3)

(4)

As examples of the terephthalic acid dihalide are mentioned terephthalic acid dichloride and terephthalic acid dibromide. As examples of the hydroquinone are mentioned hydroquinone, methylhydroquinone, ethylhydroquinone, t-butylhydroquinone, chlorohydroquinone and bromohydroquinone. Further, as example of the catechol are mentioned catechol, methylcatechol, ethylcatechol, propylcatechol, t-butylcatechol, chlorocatechol and bromocatechol.

The solvent to be used is not specially limited, but as examples thereof are mentioned halogen-containing solvents such as o-dichlorobenzene, dichloroethane and tetrachloroethane, polar solvents such as dimethylsulfoxide (DMSO), dimethylformamide (DMF) and N-methylpyrrolidone (NMP), and ether type solvents such as tetrahydrofuran (THF) and dioxane. The acid acceptor to be used is not specially limited, either. For example, there may be used pyridine, triethylamine or tripropylamine. Conditions for the solution polymerization are not specially limited, but usually involve a reaction temperature of 50° C. to 200° C., preferably 60° C. to 150° C., and a reaction time of usually 1 to 10 hours, preferably 2 to 7 hours.

As to feed compositions (mole ratios) of the starting components $A^2$ to $D^2$ the value of $A^2/(C^2+D^2)$ is usually in the range from 40/60 to 60/40, preferably 45/55 to 55/45, more preferably 48/52 to 52/48, most preferably 50/50. The value of $A^2/B^2$ is preferably in the range from 49/1 to 20/30, more preferably 48/2 to 25/25, and the value of $C^2/D^2$ is preferably in the range from 10/40 to 45/5, more preferably 15/45 to 40/10.

As to feed compositions (mole ratios) of the starting components $A^2$ to $D^2$ in the case of using a dihalide of phenylenediacrylic acid (component $B2^2$) such as phenylenediacrylic acid dichloride or phenylenediacrylic acid dibromide in place of the above 4-hydroxycinnamic acid halide (component $B1^2$), the value of $(A^2+B2^2)/(C^2+D^2)$ is usually in the range from 40/60 to 60/40, preferably 45/55 to 55/45, more preferably 48/52 to 52/48, most preferably 50/50. The value of $A^2/B2^2$ is preferably in the range from 49/1 to 25/25, more preferably 48/2 to 30/20, and the value of $C^2/D^2$ is preferably in the range from 10/40 to 45/5, more preferably 15/45 to 40/10.

The value of wavelength dispersion of birefringence is represented in terms of K value of the following equation (5) which is the ratio of birefringence ($\Delta n$) at a light wavelength of 450 nm to that at 600 nm:

$$K=\Delta n(450\ nm)/\Delta n(600\ nm) \qquad (5)$$

The K value of the polyester in the present invention depends mainly on the amount of 4-hydroxycinnamic acid units or phenylene diacrylic acid units introduced into the polymer, but is usually in the range from 1.14 to 1.35. As the amount of 4-hydroxycinnamic acid units or phenylene diacrylic acid units increases, the K value increases as well. Thus, in the polyester of the present invention, the K value can be controlled freely by controlling the amount of 4-hydroxycinnamic acid units or phenylene diacrylic acid units.

EXAMPLES

The following examples are given, but it is to be understood-that-the invention is not limited-thereto. The following analyzing methods were used in those examples.

(1) Determination of Polymer Composition

Each polymr obtained was dissolved in deuterated chloroform or deuterated trifluoroacetic acid and the composition thereof was determined by using $^1$H-NMR of 400 MHz (JNM-GX400, a product of Japan Electron Optics Laboratory Co., Ltd. ).

(2) Measurement of Inherent Viscosity

Determined at 30° C. in mixed phenol/tetrachloroethane (60/40 weight ratio) solvent, using a Ubbelohde's viscometer.

(3) Measurement of DSC

Determined using Du Pont 990 Thermal Analyzer.

(4) Observation using Optical Microscope

Observed using a polarizing microscope, BH2 (a product of Olympus Optical Co., Ltd.).

(5) Measurement of Wavelength Dispersion of Birefringence

A film sample obtained by heat treatment on a glass sheet with rubbed polyimide alignment film and subsequent cooling to fix the orientation was measured for birefringence at each of various wavelengths in accordance with the Senarmont method using monochromatic lights of various wavelength each emitted from a monochrometer. Then, wavelength dispersion was determined by fitting of the resulting data in accordance with Koshy's equation.

Example 1

100 mmol of terephthalic acid, 20 mmol of 4-acetoxycinnamic acid, 40 mmol of hydroquinone diacetate and 60 mmol of catechol diacetate were heated with stirring in a 300 ml flask equipped with a cooling tube for the outflow of acetic acid, in a nitrogen gas stream at 270° C. for 8 hours. The polymer thus prepared was dissolved in tetrachloroethane and the resulting solution was poured into a large amount of methanol for purification. Table 1 shows structural units, composition and $\eta$inh of the polymer thus purified. According to DSC measurement and polarizing microscope observation, the polymer was found to assume glass phase at Tg of 101° C. and a nematic liquid crystal phase at higher temperatures.

A small amount of the polymer was put on slide glass and then cover glass was put thereon, followed by heating on a hot plate at 220° C. for 10 minutes, then shearing was applied to the polymer. The sample was then taken down from the hot plate and cooled to find that it was transparent. Upon observation using the polarizing microscope it turned out that the nematic liquid crystal phase was fixed completely. The K value of the polymer was as large as 1.19 and thus it turned out that the polymer prepared in this Example had a large wavelength dispersion of birefringence.

Comprative Example 1

Using 100 mmol of terephthalic acid, 40 mmol of hydroquinone diacetate and 60 mmol of catechol diacetate, a polymer was prepared in the same way as in Example 1. The polymer was then dissolved in tetrachloroethane and the resulting solution was poured into a large amount of methanol for purification. Table 1 shows structural units, composition and $\eta$inh of the polymer. According to DSC measurement and polarizing microscope observation, the polymer was found to assume glass phase at Tg of 104° C. and a nematic liquid crystal phase at higher temperatures.

A small amount of the polymer was put on slide glass and then cover glass was put thereon, followed by heating on a hot plate at 220° C. for 10 minutes, then shearing was applied to the polymer. The sample was then taken down from the hot plate and cooled to find that it was transparent. Upon observation using the polarizing microscope it turned out that the nematic liquid crystal phase was fixed completely. However, the K value of the polymer was 1.13, indicating a smaller wavelength dispersion of birefringence than that of the polymer prepared in Example 1.

Example 2

100 mmol of terephthalic acid dichloride, 50 mmol of 4-hydroxycinnamic acid chloride, 40 mmol of methylhydroquinone and 60 mmol of catechol were dissolved in 500 ml of o-dichlorobenzene, then 50 ml of pyridine was added as an acid acceptor, followed by heating with stirring in a nitrogen gas stream at 70° C. for 4 hours to prepare a polymer. The reaction solution was poured into a large amount of methanol and deposited polymer was recovered. Structural units, composition and $\eta$inh of the polymer obtained are as shown in Table 1. According to DSC measurement and polarizing microscope observation, the polymer was found to assume glass phase at Tg of 94° C. and a nematic liquid crystal phase at higher temperatures.

A small amount of the polymer was put on slide glass and then cover glass was put thereon, followed by heating on a hot plate at 190° C. for 15 minutes, then shearing was applied to the polymer. The sample was then taken down from the hot plate and cooled to find that it was transparent. Upon observation using the polarizing microscope it turned out that the nematic liquid crystal phase was fixed completely. The K value of the polymer was as large as 1.21, thus indicating a large wavelength dispersion of birefringence.

Examples 3–8

Polymers were prepared as Examples 3, 4, 6 and Examples 5, 7, 8 in accordance with Examples 1 and 2, respectively. Properties of the polymers are as shown in Table 1. All of the polymers exhibited a nematic crystal phase at temperatures higher than their Tg levels and did not have a crystal phase. With respect to each of the polymers, heat treatment was performed for orientation in the same way as in Example 1, followed by cooling to a temperature lower than the Tg level of the polymer, to afford a highly transparent film in which the nematic orientation of liquid crystal was fixed. The K value of the polymers were as high as 1.17 to 1.23, thus indicating a very large wavelength dispersion of birefringence.

Comparative Example 2

Using 100 mmol of terephthalic acid, 30 mmol of 4-acetoxycinnamic acid and 100 mmol of hydroquinone diacetate, such a polymer as shown in Table 1 was prepared in the same manner as in Example 1. According to DSC measurement and polarizing microscope observation, the polymer was found to assume a nematic phase in the state of liquid crystal, but at a temperature lower than the liquid crystal transition point thereof it exhibited a clear crystal phase, not having glass phase.

A small amount of the polymer was put on slide glass and then cover glass was put thereon, followed by heating on a hot plate at 210° C. for 10 minutes. Thereafter, the sample was taken down from the hot plate together with the slide glass and cover glass and cooled to find that it was whitely turbid by crystallization. Thus it was impossible to fix the nematic liquid crystal phase. The measurement of K value was not feasible, either, because of marked white turbidity of the resulting film.

TABLE 1

| Example No. and Comparative Example No. | Structure Unit A | Unit B | Unit C | Unit D | Composition (mole ratio) A:B:C:D | inh (dl/g) | Tg (°C.) | Liquid Crystal Phase | Fixing | K value |
|---|---|---|---|---|---|---|---|---|---|---|
| Example | | | | | | | | | | |
| 1 | TPA | 4HCA | HQ | CT | 52:10:19:29 | 0.23 | 101 | Nm | | 1.19 |
| 2 | TPA | 4HCA | MHQ | CT | 49:25:20:31 | 0.21 | 94 | Nm | | 1.21 |
| 3 | TPA | 4HCA | ClHQ | CT | 51:15:35:14 | 0.25 | 100 | Nm | | 1.20 |
| 4 | TPA | 4HCA | t-BuHQ | CT | 51:24:16:35 | 0.30 | 102 | Nm | | 1.22 |
| 5 | TPA | 4HCA | HQ | BrCT | 50:5:13:37 | 0.13 | 97 | Nm | | 1.17 |
| 6 | TPA | 4HCA | HQ | EtCT | 49:6:35:16 | 0.34 | 105 | Nm | | 1.17 |
| 7 | TPA | 4HCA | MHQ | ClCT | 52:20:20:28 | 0.19 | 93 | Nm | | 1.21 |
| 8 | TPA | 4HCA | HQ | MCT | 50:32:14:36 | 0.20 | 90 | Nm | | 1.23 |
| Comparative Example | | | | | | | | | | |
| 1 | TPA | — | HQ | CT | 50:0:19:31 | 0.21 | 104 | Nm | | 1.13 |
| 2 | TPA | 4HCA | HQ | — | 51:15:49:0 | 0.23 | — | Nm | x | not measurable |

TPA: terephthalic acid unit,
4HCA: 4-hydroxycinnamic acid unit,
HQ: hydroquinone unit,
MHQ: methylhydroquinone unit,
ClHQ: chlorohydroquinone unit,
t-BuHQ: t-butylhydroquinone unit
CT: catechol unit,
BrCT: 4-bromocatechol unit,
EtCT: 4-ethylcatechol unit,
ClCT: 4-chlorocatechol unit,
MCT: 3-methylcatechol unit,
Nm: nematic liquid crystal phase

Example 9

200 mmol of terephthalic acid, 50 mmol of p-phenylenediacrylic acid, 100 mmol of methylhydroquinone diacetate and 150 mmol of catechol diacetate were heated with stirring in a 500 ml flask equipped with a cooling tube for the outflow of acetic acid, in a nitrogen gas stream at 270° C. for 8 hours. The polymer thus prepared was dissolved in tetrachloroethane and the resulting solution was poured into a large amount of methanol for purification. Structural units, composition and ηinh of the polymer thus purified are as set forth in Table 2. According to DSC measurement and polarizing microscope observation, the polymer was found to assume glass phase at Tg of 108° C. and a nematic liquid crystal phase at higher temperatures.

A small amount of the polymer was put on slide glass and then cover glass was put thereon, followed by heating on a hot plate at 220° C. for 10 minutes. The sample was then taken down from the hot plate and cooled to find that it was transparent. As a result of observation using the polarizing microscope, it turned out the nematic liquid crystal phase was fixed completely. The K value of the polymer was as large as 1.24, thus indicating a large wavelength dispersion of birefringence.

Comparative Example 3

250 mmol of terephthalic acid, 100 mmol of methylhydroquinone diacetate and 150 mmol of catechol diacetate were heated with stirring in a 500 ml flask equipped with a cooling tube for the outflow of acetic acid, in a nitrogen gas stream at 270° C. for 8 hours. The polymer thus prepared was dissolved in tetrachloroethane and the resulting solution was poured into a large amount of methanol for purification. Structural units, composition and ηinh of the polymer thus purified are as set forth in Table 2. According to DSC measurement and polarizing microscope observation, the polymer was found to assume glass phase at Tg of 105° C. and a nematic liquid crystal phase at higher temperatures.

A small amount of the polymer was put on slide glass and then cover glass was put thereon, followed by heating on a hot plate at 220° C. for 10 minutes. The sample was then taken down from the hot plate and cooled to find that it was transparent. As a result of observation using the polarizing microscope, it turned out the nematic liquid crystal phase was fixed completely. However, the K value of the polymer was 1.13, indicating a smaller wavelength dispersion of birefringence than that of the polymer prepared in Example 9.

Example 10

120 mmol of terephthalic acid dichloride, 5 mmol of p-henylenediacrylic acid chloride, 50 mmol of hydroquinone and 75 mmol of catechol were dissolved in 600 ml of o-dichlorobenzene, then 60 ml of pyridine was added as an acid acceptor, followed by heating in a nitrogen gas stream at 70° C. for 4 hours to prepare a polymer. The reaction solution was poured into a large amount of methanol and deposited polymer was recovered. Structural units, composition and ηinh of the polymer are as set forth in Table 2. According to DSC measurement and polarizing microscope observation, the polymer was found to exhibit glass phase at Tg of 102° C. and a nematic liquid crystal phase at higher temperatures.

A small amount of the polymer was put on slide glass and then cover glass was put thereon, followed by heating on a hot plate at 190° C. for 15 minutes. The sample was then taken down from the hot plate and cooled to find that it was transparent. As a result of observation using the polarizing microscope, it turned out the nematic liquid crystal phase was fixed completely. The K value of the polymer was as large as 1.18, indicating a large wavelength dispersion of birefringence.

Examples 11–16

Polymers were prepared as Examples 14, 15, 16 and Examples 11, 12, 13 in accordance with Examples 9 and 10, respectively. Properties of the polymers are as set forth in Table 2. All of the polymers exhibited a nematic crystal phase at temperatures higher than their Tg levels and did not have a crystal phase. With respect to each of the polymers, heat treatment was performed for orientation in the same way as in Example 1, followed by cooling to a temperature lower than the Tg level of the polymer, to afford a highly transparent film in which the nematic orientation of liquid crystal was fixed. The K value of the polymers were as high as 1.18 to 1.32, indicating a very large wavelength dispersion of birefringence.

Comparative Example 4

Using 220 mmol of terephthalic acid, 30 mmol of p-henylenediacrylic acid and 250 mmol of hydroquinone diacetate, such a polymer as shown in Table 2 was prepared in the same manner as in Example 9. According to DSC measurement and polarizing microscope observation, the polymer was found to assume a nematic phase in the state of liquid crystal, but at a temperature lower than the liquid crystal transition point thereof it exhibited a clear crystal phase, not having glass phase.

A small amount of the polymer was put on slide glass and then cover glass was put thereon, followed by heating on a hot plate at 220° C. for 10 minutes. The sample was then taken down from the hot plate and cooled to find that it was whitely turbid by crystallization. Thus it was impossible to fix the nematic liquid crystal phase. The measurement of K value was not feasible, either, because of marked white turbidity of the resulting film.

tures of liquid crystal are applicable suitably to various functional materials, especially optical elements, and thus their industrial value is extremely high.

Figure 1:
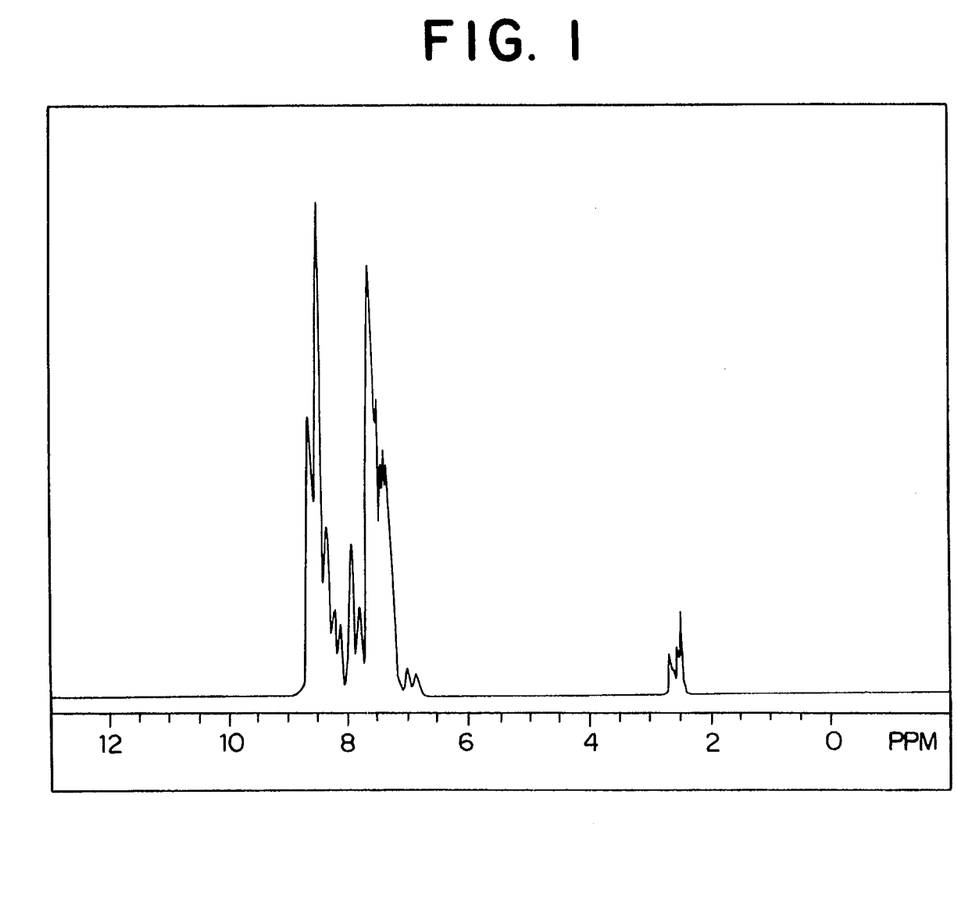
FIG. 1 shows $^1$H-NMR spectrum of the polyester prepared in Example 1.
Figure 2:
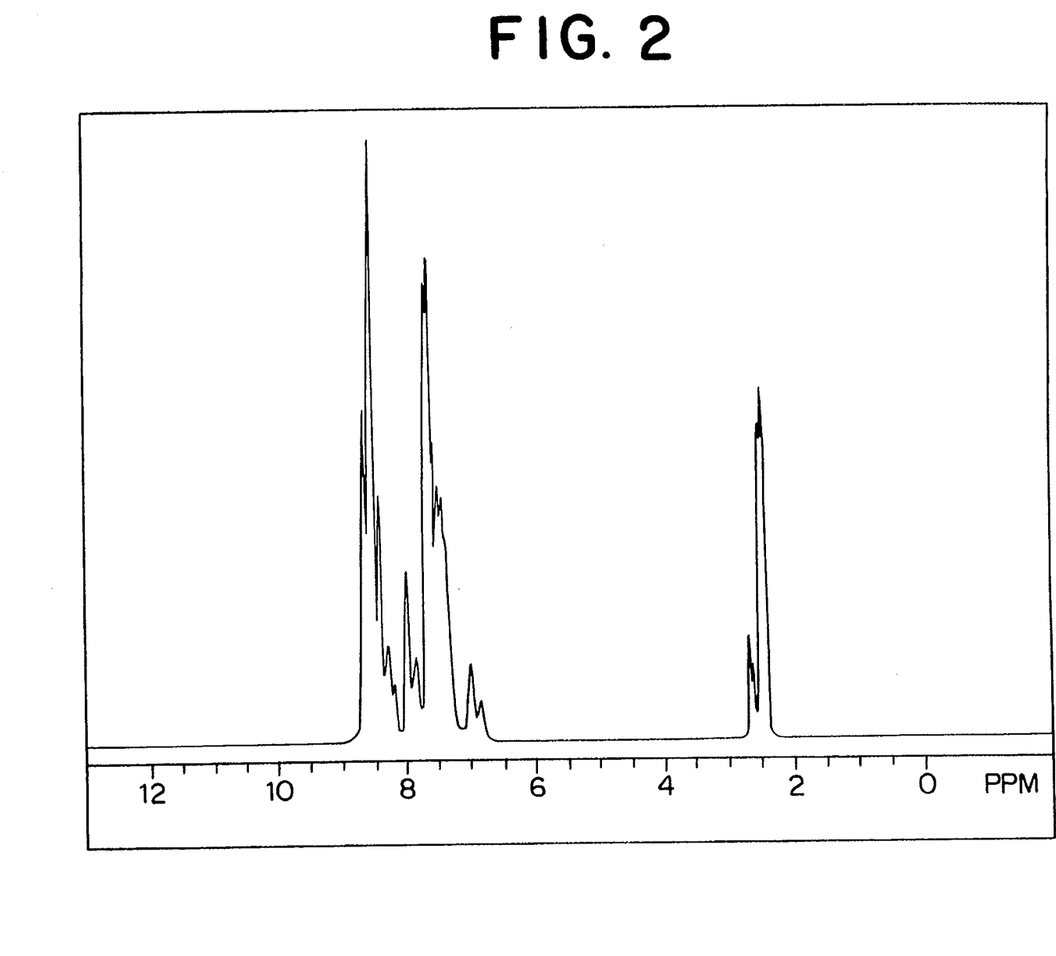
FIG. 2 shows $^1$H-NMR spectrum of the polyester prepared in Example 2.
Figure 3:
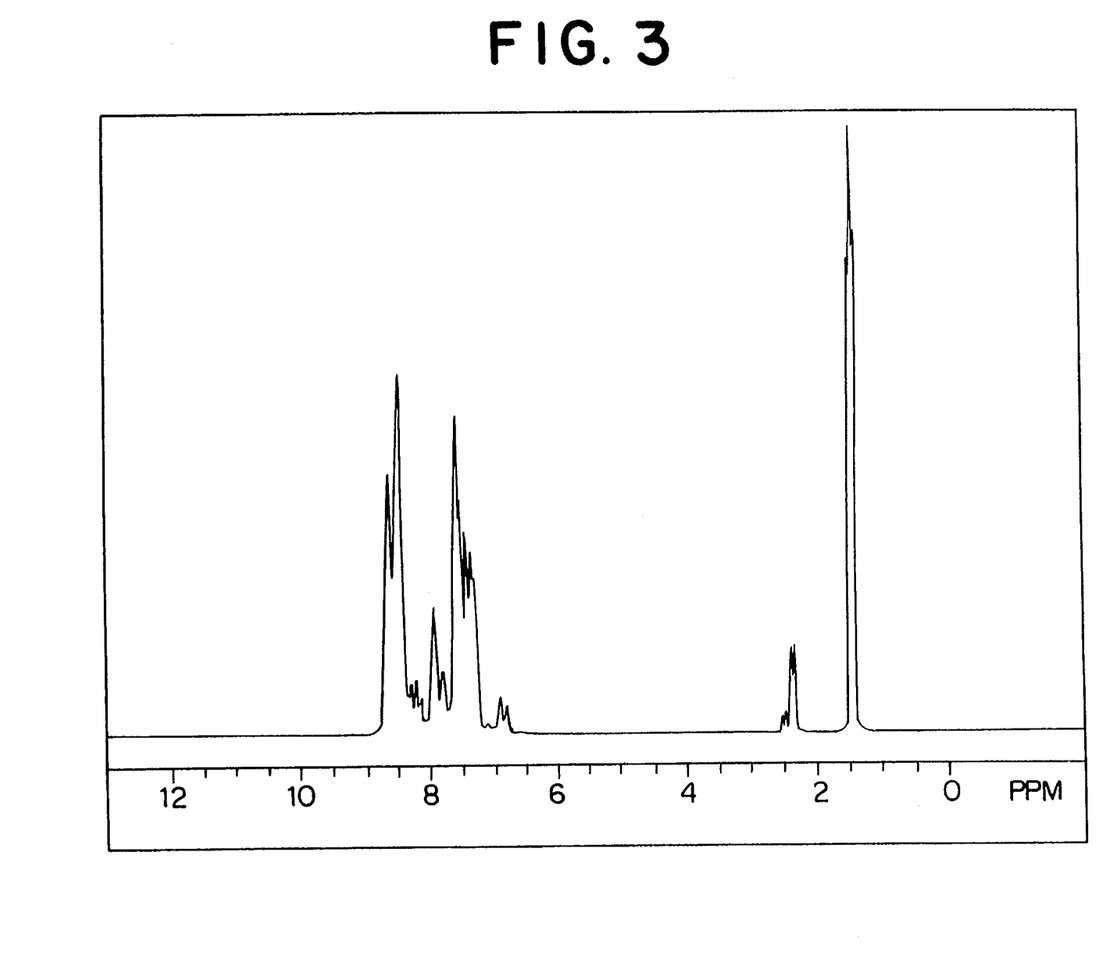
FIG. 3 shows $^1$H-NMR spectrum of the polyester prepared in Example 4.
Figure 4:
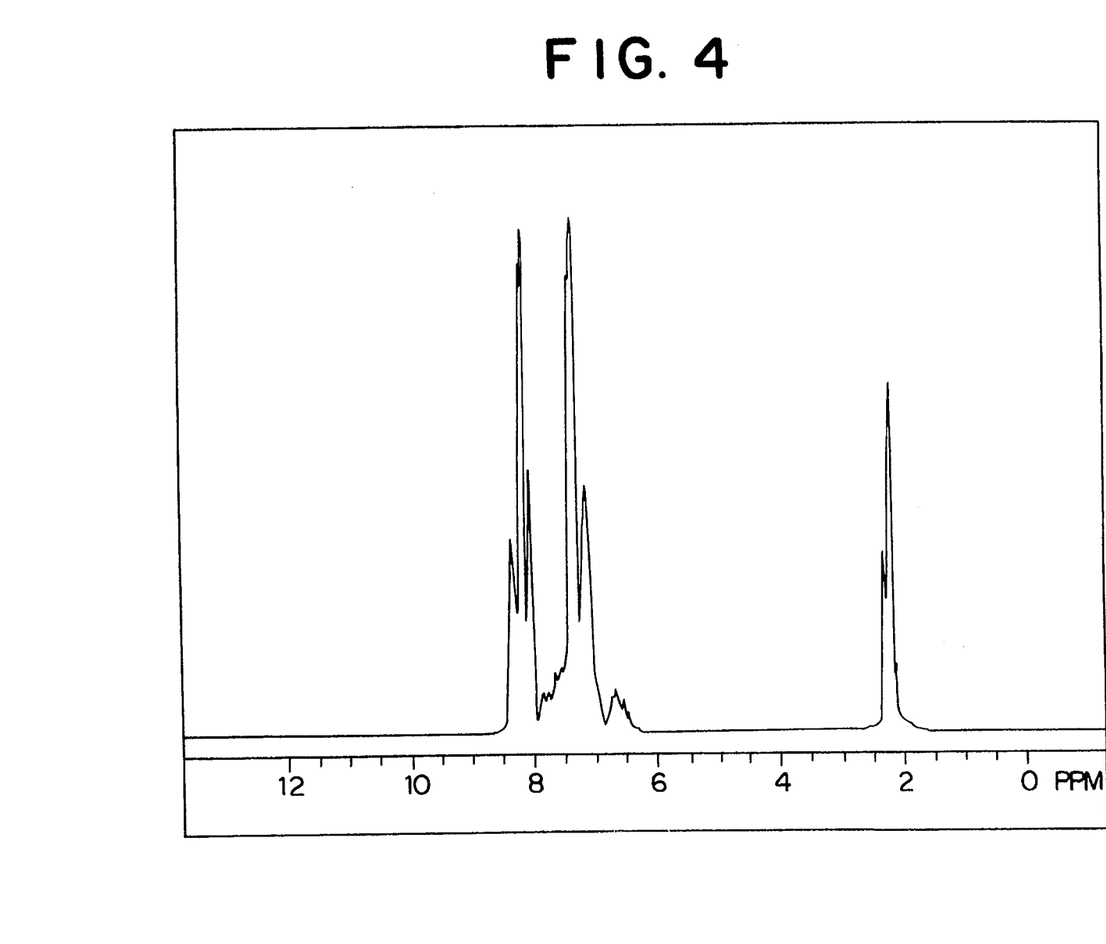
FIG. 4 shows $^1$H-NMR spectrum of the polyester prepared in Example 9.
Figure 5:
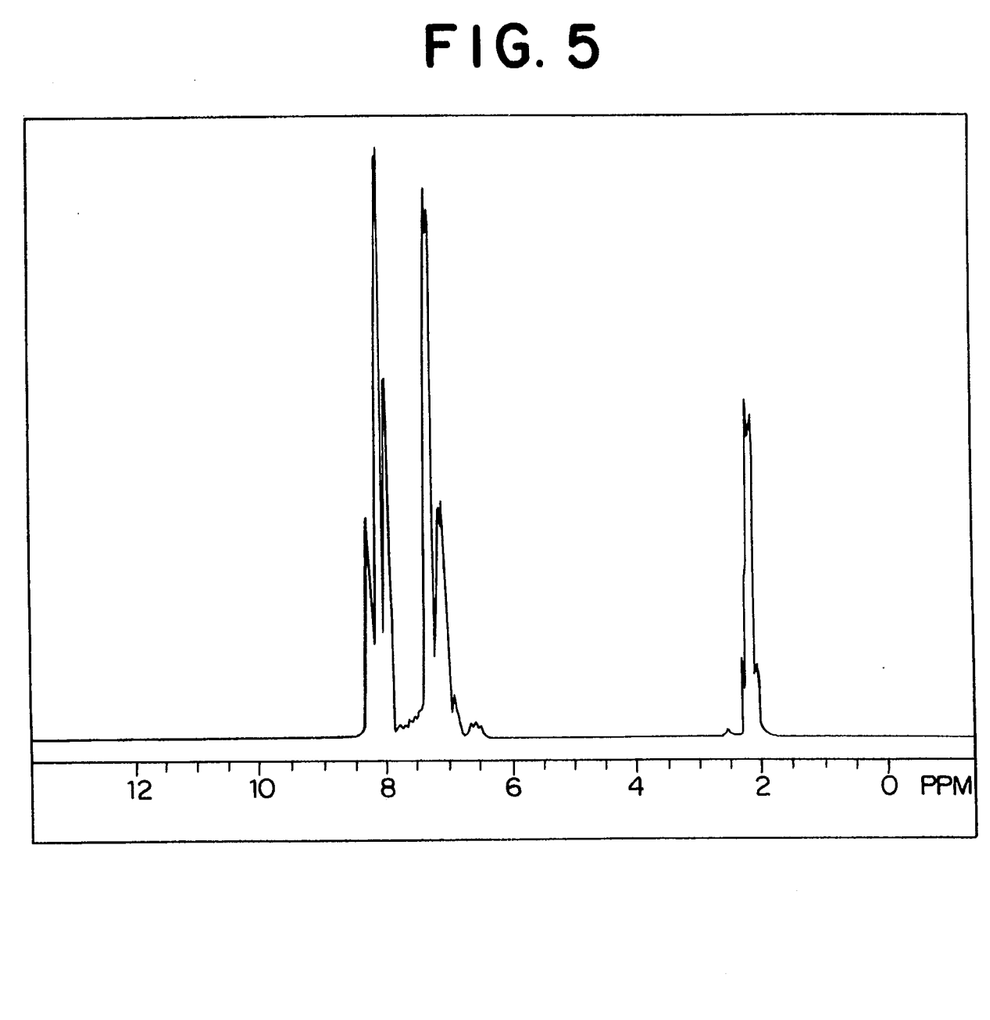
FIG. 5 shows $^1$H-NMR spectrum of the polyester prepared in Example 10.
Figure 6:
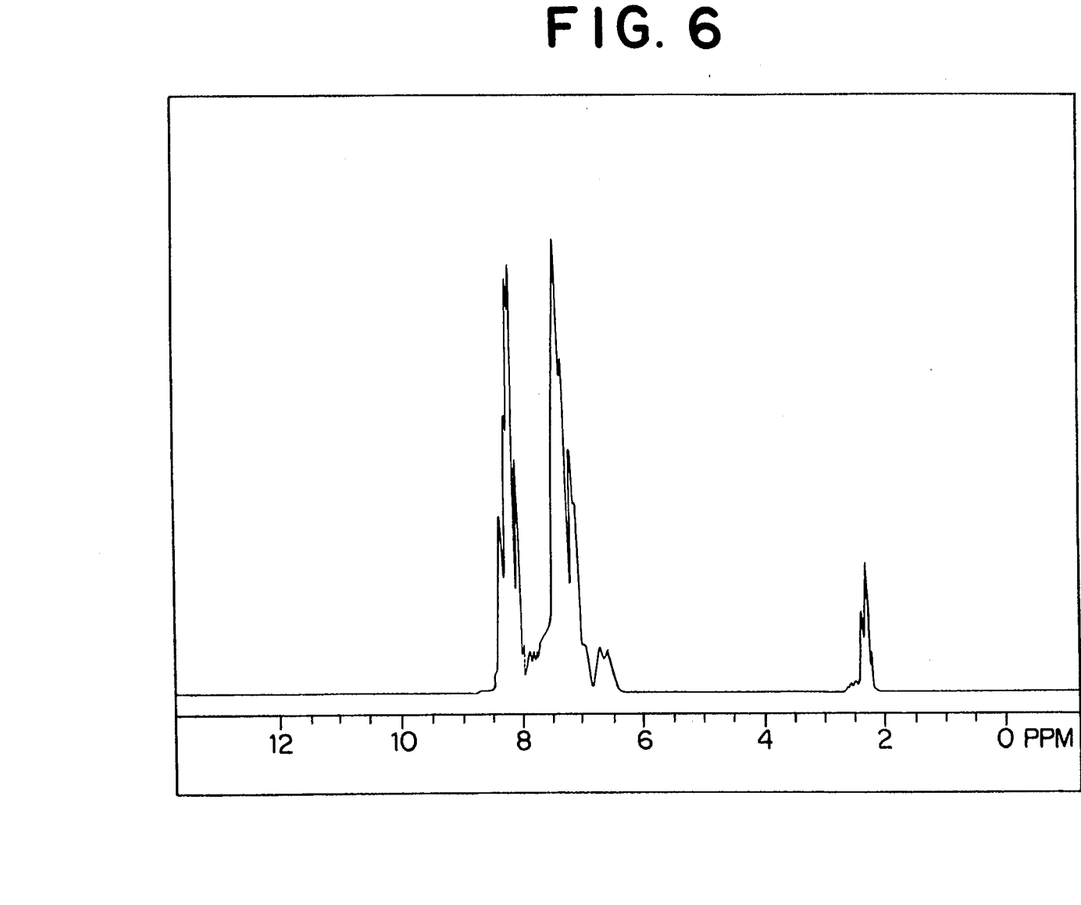
FIG. 6 shows $^1$H-NMR spectrum of the polyester prepared in Example 15.

What is claimed is:

1. A liquid crystalline polyester comprising structural units represented by the following general formulae A, B, C and D:

TABLE 2

| Example No. and Comparative Example No. | Structure | | | | Composition (mole ratio) A:B:C:D | inh (dl/g) | Tg (°C.) | Liquid Crystal Phase | Fixing | K value |
|---|---|---|---|---|---|---|---|---|---|---|
| | Unit A | Unit B | Unit C | Unit D | | | | | | |
| Example | | | | | | | | | | |
| 9 | TPA | PDAA | MHQ | CT | 42:9:21:39 | 0.22 | 108 | Nm | | 1.24 |
| 10 | TPA | PDAA | HQ | MCT | 48:2:20:30 | 0.20 | 102 | Nm | | 1.18 |
| 11 | TPA | PDAA | ClHQ | CT | 35:15:27:23 | 0.31 | 112 | Nm | | 1.30 |
| 12 | TPA | PDAA | t-BuHQ | CT | 43:6:32:19 | 0.18 | 105 | Nm | | 1.22 |
| 13 | TPA | PDAA | HQ | BrCT | 41:10:14:35 | 0.19 | 105 | Nm | | 1.25 |
| 14 | TPA | PDAA | HQ | EtCT | 46:4:35:15 | 0.25 | 107 | Nm | | 1.19 |
| 15 | TPA | PDAA | HQ | CT | 41:9:20:30 | 0.12 | 97 | Nm | | 1.23 |
| 16 | TPA | PDAA | MHQ | ClCt | 32:18:14:36 | 0.30 | 111 | Nm | | 1.32 |
| Comparative Example | | | | | | | | | | |
| 3 | TPA | — | MHQ | CT | 49:0:22:39 | 0.21 | 105 | Nm | | 1.13 |
| 4 | TPA | PDAA | HQ | — | 45:5:50:0 | 0.23 | — | Nm | x | not measurable |

TPA: terephthalic acid unit,
PDAA: p-phenylenediacrylic acid unit,
MHQ: methylhydroquinone unit,
HQ: hydroquinone unit,
ClHQ: chlorohydroquinone unit,
t-BuHQ: t-butylhydroquinone unit
CT: catechol unit,
MCT: 3-methylcatechol unit,
BrCT: 4-bromocatechol unit,
EtCT: 4-ethylcatechol unit,
ClCT: 4-chlorocatechol unit,
Nm: nematic liquid crystal phase Thus, the liquid crystalline polyesters prepared according to the present invention each exhibit a large wavelength dispersion of birefringence and assume glass phase directly, not having crystal phase, at a temperature lower than its liquid crystal transition point, so by cooling from the temperature at which the polyester assumes the state of liquid crystal down to a temperature lower than the liquid crystal transition point (glass transition point), it is made possible to fix the oriented structure in the state of liquid crystal. The thus-obtained transparent materials retaining their orientation struc- -continued C:   and

D:

where X and Y are each independently H, Cl, Br or an alkyl group having 1 to 4 carbon atoms, the molar ratio of A/B is in the range from 49/1 to 20/30 and that of C/D is in the range from 10/40 to 45/5.

2. A liquid crystalline polyester as set forth in claim 1, wherein, in the composition represented by molar ratio, the carboxyl residue and the alcohol residue (—O—) are substantially in a relation of equal quantity.

3. A liquid crystalline polyester as set forth in claim 1, wherein the structural unit in B is B1, A/B1 is in the range from 48/2 to 25/25, C/D is in the range from 15/35 to 40/10, and A/(C+D) is in the range from 48/52 to 52/48.

4. A liquid crystalline polyester as set forth in claim 1, wherein the structural unit in B is B2, A/B2 is in the range from 48/2 to 30/20, C/D is in the range from 15/35 to 40/10, and (A+B2)/(C+D) is in the range from 48/52 to 52/48.

* * * * *